(12) United States Patent
Yamamoto et al.

(10) Patent No.: US 7,058,692 B2
(45) Date of Patent: Jun. 6, 2006

(54) COMPUTER, COMPUTER SYSTEM, AND DATA TRANSFER METHOD

(75) Inventors: Yasutomo Yamamoto, Sagamihara (JP); Takashi Oeda, Sagamihara (JP); Takahiko Shoyama, Hadano (JP)

(73) Assignee: Hitachi, Ltd., Tokyo (JP)

( * ) Notice: Subject to any disclaimer, the term of this patent is extended or adjusted under 35 U.S.C. 154(b) by 822 days.

(21) Appl. No.: 09/798,324

(22) Filed: Mar. 2, 2001

(65) Prior Publication Data

US 2002/0004845 A1    Jan. 10, 2002

(30) Foreign Application Priority Data

Jul. 6, 2000    (JP)    ............................. 2000-205509

(51) Int. Cl.
  *G06F 15/167*  (2006.01)
(52) U.S. Cl. ...................... 709/213; 709/216; 711/118; 711/147; 711/148; 707/8; 707/204
(58) Field of Classification Search .................... 709/2, 709/213, 216; 711/4, 111, 112, 118, 147, 711/148; 707/8, 10, 200, 204
   See application file for complete search history.

(56) References Cited

U.S. PATENT DOCUMENTS

| | | | |
|---|---|---|---|
| 5,535,372 A * | 7/1996 | Benhase et al. | ............... 703/23 |
| 5,901,327 A * | 5/1999 | Ofek | ............... 710/5 |
| 5,909,692 A * | 6/1999 | Yanai et al. | ............... 711/4 |
| 5,920,893 A | 7/1999 | Nakayama et al. | |
| 5,983,317 A | 11/1999 | Kanda et al. | |
| 6,009,498 A * | 12/1999 | Kumasawa et al. | ......... 711/113 |
| 6,041,386 A * | 3/2000 | Bello | ............................. 711/4 |
| 6,041,391 A | 3/2000 | Kanda et al. | |
| 6,115,797 A * | 9/2000 | Kanda et al. | ............... 711/147 |
| 6,260,120 B1 * | 7/2001 | Blumenau et al. | .......... 711/152 |

(Continued)

FOREIGN PATENT DOCUMENTS

JP    09-325905    12/1997

OTHER PUBLICATIONS

Patterson, David A. et al., "A Case for Redundant Arrays of Inexpensive Disks (RAID)," Computer Science Division, Department of Electrical Engineering and Computer Sciences, University of California, 1988, pp. 109-115.

(Continued)

*Primary Examiner*—Bunjob Jaroenchonwanit
*Assistant Examiner*—Phuoc H. Nguyen
(74) *Attorney, Agent, or Firm*—Townsend and Townsend and Crew LLP

(57) ABSTRACT

The present invention provides techniques, including a method and system, for transferring data between computer systems, for example, a mainframe and a Personal Computer (PC), having storage systems of different formats, efficiently. One embodiment provides a method for transferring data from a first system, having a first processor and a first memory, using a first format to a second system, having a second processor and a second memory, using a second format. The method includes a first system receiving data of a first format from a first disk unit; processing the data of the first format into transformed data, where the transformed data is the data transformed into the second format; storing the transformed data in the first memory; and sending the transformed data from the first memory to the second system responsive to a request from the second system.

19 Claims, 12 Drawing Sheets

U.S. PATENT DOCUMENTS

| | | | |
|---|---|---|---|
| 6,275,910 B1 * | 8/2001 | Kanda et al. | 709/214 |
| 6,505,273 B2 * | 1/2003 | Taroda et al. | 711/112 |
| 6,633,962 B1 * | 10/2003 | Burton et al. | 711/163 |
| 6,766,359 B1 * | 7/2004 | Oliveira et al. | 709/213 |

OTHER PUBLICATIONS

Patent Abstracts of Japan, 06-150557, May 31, 1994, pp. 2.
Patent Abstracts of Japan, 09-258908, Oct. 3, 1997, pp. 2.

* cited by examiner

DISK CACHE 107

CACHE CONTROL INFORMATION 108

SEGMENT CONTROL INFORMATION 410

COMPUTER, COMPUTER SYSTEM, AND DATA TRANSFER METHOD

CROSS-REFERENCES TO RELATED APPLICATIONS

This application is related to and claims priority from Japanese Patent Application No. 2000-205509, filed on Jul. 6, 2000.

BACKGROUND OF THE INVENTION

The present invention relates generally to data transfer between computer systems and more particularly to techniques for transferring data between computer systems were each employs a storage unit storing data in a different format.

As their external storage unit, mainframe hosts employ a magnetic disk unit which uses a variable-sized record data format to store data. Conventionally, this type of magnetic disk unit has a CKD (Count Key Data) interface which enables access to variable-sized record data. That is, conventionally, storage of variable-sized record format data is physically implemented in a magnetic disk unit having a CKD interface.

Recently, there have been employed magnetic disk units which are relatively inexpensive and used in open hosts such as personal computers and workstations, and which use a fixed-sized block (FBA: Fixed Block Architecture) format to store data. For example, RAID (Redundant Array of Inexpensive Disks) composed of a plurality of such magnetic disk units has become widely used. As described by a paper entitled "A Case for Redundant Arrays of Inexpensive Disks (RAID)" by D. Patterson, G. Gibson, and R. H. Kartz (ACM SIGMOD Conference, Chicago, Ill., June 1988, pp. 109–116), which was published in ACM SIGMOD Conference at the University of Illinois, Chicago, RAID is a technique in which a plurality of relatively inexpensive and low-reliability disk units are connected to distribute and store data to a plurality of disk units in order to realize performance enhancement by transferring data in parallel, and high availability by storing redundant data.

Incidentally, a "disk unit" recognized by a host maybe either an actual disk unit or a RAID composed of a plurality of disk units. To discriminate disk units in these two layers, a disk unit recognized by a host is hereinafter called a "logical disk unit", while a "physical disk unit" refers to an actual disk unit which has a CKD interface and stores CKD format data, or which has an FBA interface and stores FBA format data.

Further, hereinafter, a variable-sized record format used by mainframe hosts is called the "CKD format"; a disk unit which has a CKD interface and stores data in the CKD format is called a "CKD disk unit"; and a disk unit which stores data in the FBA format is called an "FBA disk unit".

Still further, hereinafter, a CKD disk unit recognized by a host is called a "logical CKD disk unit", while an FBA disk unit recognized by a host is called a "logical FBA disk unit". On the other hand, an actual CKD disk unit is called a "physical CKD disk unit", while an actual FBA disk unit is called a "physical FBA disk unit".

When it is not necessary to discriminate between a logical FBA disk unit and a physical FBA disk unit, they are each simply called an FBA disk unit, while when it is not necessary to discriminate between a logical CKD disk unit and a physical CKD disk unit, they are each simply called a CKD disk unit. It should be noted that a logical FBA disk unit and a physical FBA disk unit may be actually the same FBA disk unit, and similarly, a logical CKD disk unit and a physical CKD disk unit may be the same CKD disk unit.

As described above, a physical FBA disk unit used for RAID has a SCSI interface, etc. and stores data in the FBA format. Therefore, in a storage system connected to a mainframe host to receive CKD format data from a CKD interface and write the data into a physical disk unit of the FBA format, it is necessary to incorporate a transformation mechanism transforming the CKD format to the FBA format as well as its reverse transformation mechanism.

For example, a mainframe computer which has a SCSI interface and incorporates an FBA disk unit in its frame is a Mutiprise 2000, produced by IBM Corp. of Armonk N.Y. In this mainframe, the CPU issues a group of commands (CCW: Channel Command Word) to access CKD format data as input/output requests. And a disk control processor dedicated for input/output control of built-in disk units receives/understands the requests, transforms them to a group of commands (SCSI commands) to access FBA format data, and inputs/outputs the data to/from an FBA disk unit. This transformation mechanism makes it possible to use an FBA disk unit as an external storage unit for a mainframe computer without changing application programs and the OS which conventionally assume use of a CKD disk unit. Another example of a format transformation mechanism of this type is disclosed in, for example, Japanese Laid-Open Patent Publication No. 6-150557 (1994).

In order to support administrative decision making by obtaining actual sales results and analyzing market needs, needs for OLAP and data mining utilizing business data held by enterprise systems which use a mainframe host are recently increasing. To accommodate the needs, a data linkage function has become important in which basic data stored in databases implemented in CKD disk units of mainframe computers is transferred to PCs and workstations, and used there.

As a method for transferring data stored in a CKD disk unit of such a mainframe computer to an open host (for example a PC or workstation), the data may be transferred between the hosts through a network such as a LAN. However, this method imposes a load on both hosts and the network, which might have an adverse influence such as reduced execution speed of other business operations. To cope with this problem, a technique disclosed in U.S. Pat. No. 5,983,317 issued Nov. 9, 1999 and U.S. Pat. No. 6,041,391 issued Mar. 21, 2000, transfers data as follows.

A storage unit composed of a physical FBA disk unit and a disk controller is connected to both a mainframe host and an open host. The disk controller of this disk unit operates so that the mainframe host recognizes the physical FBA disk unit as a logical CKD disk unit A, while the open host recognizes the same physical FBA disk unit as a logical FBA disk unit B.

First, the mainframe host reads out transfer target data stored in another CKD disk unit, generates intermediate data, and stores it in the logical CKD disk unit A. At that time, the disk controller transforms the transfer data from the CKD format to the FBA format, and writes it into the physical FBA disk unit according to a write request issued from the mainframe host to write the transfer data to the logical CKD disk unit. This transformation is performed so that count fields and data fields of the data of the CKD format remain and are included in the transformed data of the FBA format after the transformation.

Next, the open host requests access to the intermediate data written into the logical FBA disk unit B. The disk controller reads from the physical FBA disk unit the intermediate data to which access has been requested, and transfers the data to the open host without changing its FBA format.

The open host recognizes the CKD format data included in the transferred FBA format data, and performs processes such as extraction of necessary data excluding count fields, and character code conversion before using the data.

According to the above technique disclosed in U.S. Pat. Nos. 5,983,317 and 6,041,391, in order to transfer data stored in a CKD disk unit of a mainframe host to an open host, it is necessary to perform two input/output operations: writing of transfer target data read from the CKD disk unit into a physical FBA disk unit and reading of the transfer target data from the physical FBA disk unit. Because of this, it takes time to transfer data.

Thus there is a need to transfer data between host systems each handling data of a different format, at higher speed.

SUMMARY OF THE INVENTION

The present invention provides techniques, including a method and system, for transferring data between computer systems, for example, a mainframe and a Personal Computer (PC), having storage systems of different formats, efficiently.

One exemplary embodiment provides a method for transferring data from a first system, having a first processor and a first memory, using a first format to a second system, having a second processor and a second memory, using a second format. The method includes a first system receiving data of a first format from a first disk unit; processing the data of the first format into transformed data, where the transformed data is the data transformed into the second format; storing the transformed data in the first memory; and sending the transformed data from the first memory to the second system responsive to a request from the second system.

Another embodiment of the present invention transfer data of different formats at high speeds. This embodiment provides a computer having a processor for issuing an access command to access data of a first format, and a memory, the computer adopting the following configuration.

The computer comprises: an interface for receiving from another computer an access command to access data of a second format different from the first format; first command processing means for, according to a write command issued by the processor to write data of the first format, receiving the data, and storing the data in the memory; and second command processing means for, according to a read command issued by the another computer to read data of the second format, reading out the data stored in the memory by the first command processing means, and transferring the data to the another computer.

In another embodiment of the present invention a method for transferring data from the first computer to a second computer is provided; the method includes: a step of, according to a write command issued by a processor of the first computer to write data of a first format (for example, a variable-sized record format), storing the data in a memory of the first computer; and a step of, according to a read command issued by a second computer to read data of a second format (for example, a fixed-sized block format), transferring the data stored in the memory from the first computer to the second computer.

That is, the processor of the above first computer does not need to perform an input/output operation on a physical storage unit after acquiring the data to be transferred.

Therefore, it is possible to transfer data at higher speed. Furthermore, since writing of data into a memory by the processor of the first computer and reading of the data from the memory by the second computer are each performed using a storage unit access of a type supported by each command-issuing computer, it is not necessary to change the architecture of each command-issuing computer, making it possible to utilize existing resources.

In one embodiment of the present invention software is provided. Specifically, software stored in a computer readable medium for transferring data from a first format at a first system, comprising a first processor and a first memory, to a second format at a second system, comprising a second processor and a second memory. The software including: code for receiving data of a first format from a first disk unit by said first system; code for processing said data of said first format into transformed data, wherein said transformed data is said data transformed into said second format; code for storing said transformed data in said first memory; and code for sending said transformed data from said first memory to said second system responsive to a request from said second computer.

In another embodiment a computer readable medium for storing code is provided. The code is for accessing data by a first computer, wherein said first computer, having a fixed-sized block storage unit storing data of a fixed-sized block format, accesses information stored in a second computer, including a variable-sized record storage unit storing data of a variable-sized record format. The computer readable medium includes: code for emulating a logical fixed-sized block storage unit by use of a storage area of said second computer in which information read from said variable-sized record storage unit is stored; and code for accessing information in said logical fixed-sized block storage unit from said first computer.

DESCRIPTION OF THE SPECIFIC EMBODIMENTS

A first embodiment of the present invention will be first described.

Figure 1:
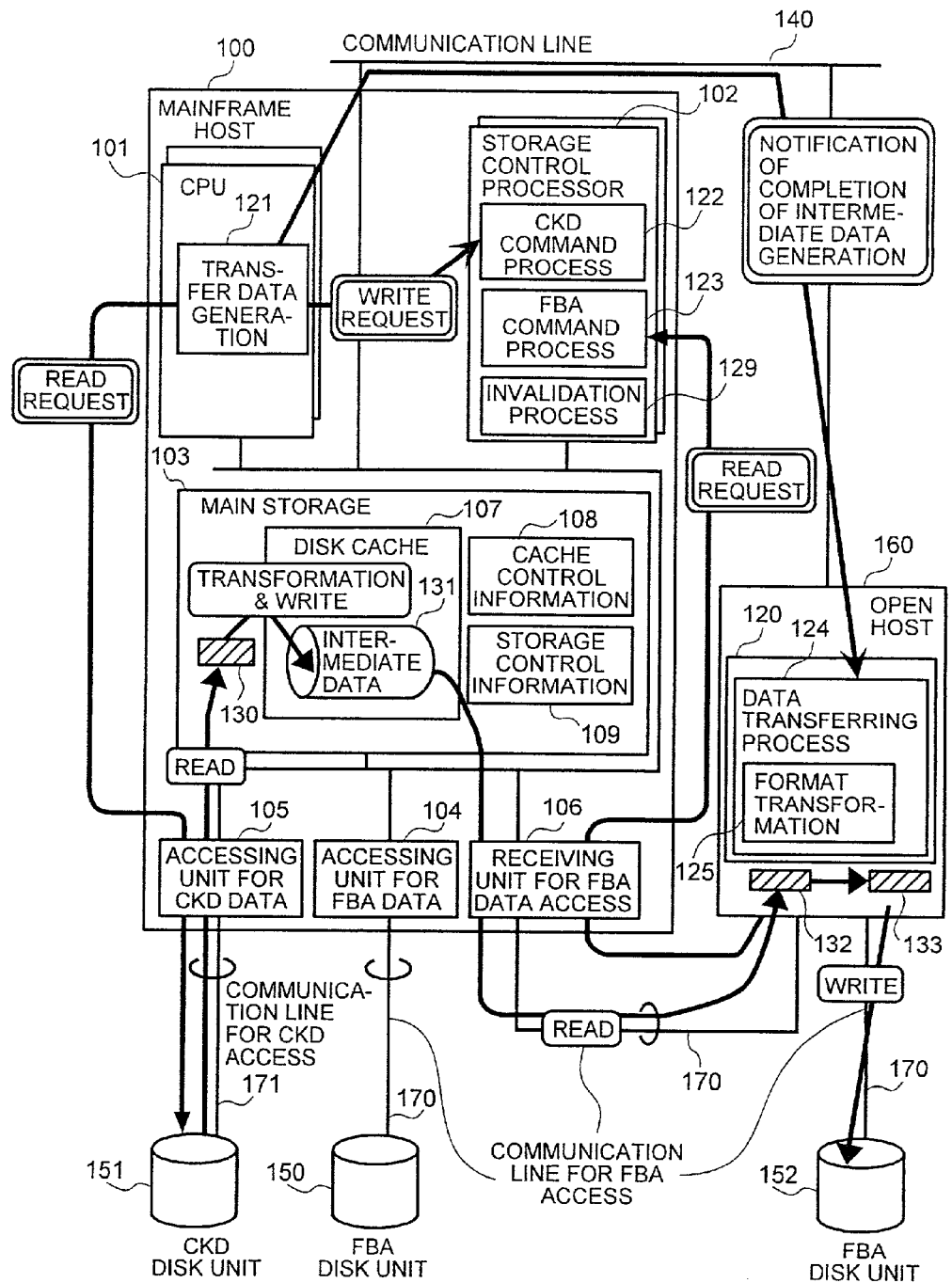
FIG. 1 is a block diagram showing the configuration of a computer system according to a first embodiment of the present invention.

FIG. 1 shows the configuration of the first embodiment of the present invention. As shown in the figure, a computer system according to this embodiment comprises a mainframe host 100, an FBA disk unit 150 connected to the mainframe host 100, a CKD disk unit 151 also connected to the mainframe host 100, an open host 160, and an FBA disk unit 152 connected to the open host 160.

The mainframe host 100 comprises at least one CPU 101, at least one storage control processor 102, a main storage 103, at least one accessing unit for FBA data 104, at least one accessing unit for CKD data 105, and at least one receiving unit for FBA data access 106.

The open host 160 comprises a CPU 120. The open host may be, for example, a PC or workstation. Application processes implemented by application programs and the OS run in the CPU 120. The OS performs such controls as allocation of memory for running application processes, and management of the file system, etc. An application process accesses an external storage unit through the OS. In this embodiment, a transfer data transferring process 124 including a format transformation process 125 is implemented in the CPU 101 as one of application processes.

The open host 160 and the mainframe host 100 are connected to each other through a communication line for FBA access 170 and a communication line 140. Specifically, the communication line for FBA access 170 is formed by, for example, a SCSI bus, while the communication line 140 is formed by a LAN, etc.

In the mainframe host 100, application processes, such as a Database management system, implemented by application programs and the OS run in the CPU 101. The OS performs such controls as allocation of memory for running application processes, and management of the file system, etc. An application process accesses an external storage unit through the OS. In this embodiment, a transfer data generation process 121 is implemented in the CPU 101 as one of application processes.

The main storage 103 is used as areas for storing data and programs employed by each CPU 101, and a disk cache area 107 used to input/output data to/from the FBA disk unit 150. Furthermore, the main storage 103 stores cache control information 108 for controlling data in the disk cache 107, and storage control information 109 for controlling each disk unit.

The storage control processor 102 has a CKD command process 122 for emulating a logical CKD disk unit using the FBA disk unit 150 for host programs such as the OS.

Generally, a host program can handle only CKD disk units. Therefore, in order for a host program to be able to access the FBA disk unit 150 as a logical CKD disk unit, the CKD command process 122 emulates the logical CKD disk unit using the disk cache 107, the FBA disk unit 150, and the storage control information 109 described later.

Specifically, the CKD command process 122 performs mapping control between a logical CKD disk unit and the FBA disk unit 150, in addition to reception of a request for access to a CKD disk unit, and an input/output operation on the FBA disk unit 150 using the disk cache 107 as described later.

The storage control processor 102 also has an FBA command process 123 for emulating a logical FBA disk unit using the FBA disk unit 150 for the open host 160. The FBA command process 123 receives a request for access to the logical FBA disk unit from the open host 160 through the receiving unit for FBA access 106, and performs input/output operation on the FBA disk unit 150 using the disk cache 107 described later.

The storage control processor 102 still also has an invalidation process 129 for controlling invalidation of data in the disk cache 107.

The accessing unit for FBA data 104 connects the mainframe host 100 with the FBA disk unit 150, and transfers access interface commands and data in the FBA format between them.

The accessing unit for CKD data 105 connects the mainframe host 100 with the CKD disk unit 151, and transfers access interface commands and data in the CKD format between them.

The receiving unit for FBA data access 106 connects the open host 160 to the mainframe host 100, receives access interface commands in the FBA format transmitted from the open host 160, and delivers the commands to the storage control processor 102. Furthermore, the receiving unit for FBA data access 106 controls the transfer of access target data between the mainframe host 100 and the open host 160.

The communication line 140 is used for communications between the mainframe host 100 and the open host 160. In this embodiment, the line is used only for event notifications such as notification of completion of intermediate data generation. Because of this, it is not necessary to employ a high-speed or wide-band communication line as the communication line 140.

The communication lines for FBA access 170 connect between the accessing unit for FBA data 104 and the FBA disk unit 150, between the receiving unit for FBA data access 106 and the open host 160, and between the open host 160 and an FBA disk unit 152. Communications using a communication protocol such as a SCSI for FBA disk units are carried out through the communication lines 170.

A communication line for CKD access 171 connects between the accessing unit for CKD data 105 and the CKD disk unit 151. Communications using a communication protocol for CKD disk units are carried out through the communication line 171.

It should be noted that the communication lines for FBA access 170 and the communication line for CKD access 171 may be formed by either parallel channels using metal cables or serial channels using optical fiber cables.

Next, description will be made of the relationship between the FBA format, which is a recording format for the FBA disk unit 150, and the CKD format, which is a recording format for logical CKD disk units emulated using the FBA disk unit 150.

As shown in FIG. 2(a), the storage area of a logical CKD disk unit is composed of a plurality of fixed-sized CKD tracks. Each CKD track is composed of one home address (HA) 510 and one or more records 500. HA 510 is the first field of each CKD track (located at the head of the track).

Each record 500 includes one or more fields, that is, a count field 501 and a data field 502, and, depending on the case, a key field (not shown) before the data field. The count field 501 is a fixed-sized field, and stores the address of the record 500 and the length of the next fields (the above data field 502 and the key field). The length of each record 500 is allowed to be varied, that is, the length of the data field 502 can differ from one record 500 to another. To accommodate this, each count field 501 stores the length of the data field 502 of the record and the length of the key field, which makes it possible to obtain the length of each field of the record by referring to its count field 501. The address of each record 500 is indicated by a set of a cylinder number, a head number, and a record number.

Figure 3:
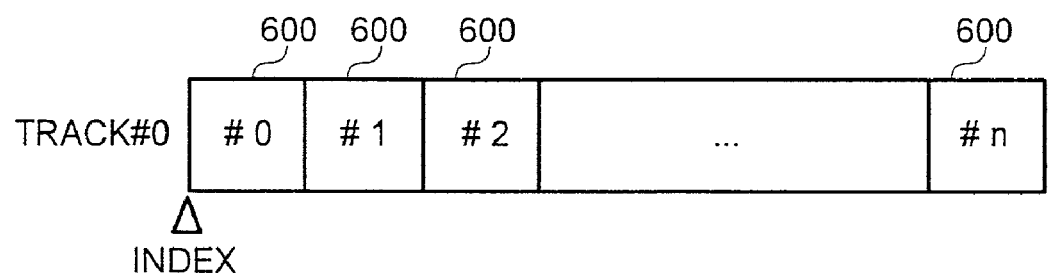
FIG. 3 is a diagram showing an FBA data format used by an embodiment of the present invention.
Figure 3:
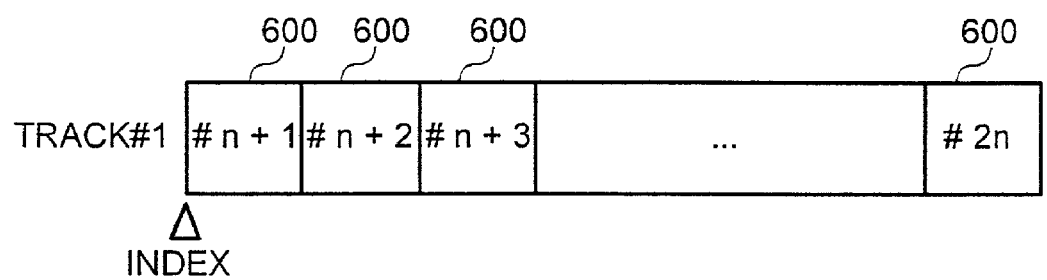

On the other hand, as shown in FIG. 3, the storage area of the FBA disk unit 150 is composed of a plurality of FBA tracks. Each FBA track is composed of blocks 600 which are predetermined-fixed-sized areas, and each block 600 is uniquely numbered in the FBA disk unit 150. Therefore, to access an area in the FBA disk unit 150, it is enough to specify the number of the first block 600 of the area, and the number of the blocks 600 which follow the first block and correspond to the area.

In this embodiment, the FBA disk unit 150 as described above is used to emulate a logical CKD disk unit, each CKD track in the logical CKD disk is assigned to enough blocks 600 to store the CKD track, and the contents of each CKD track are stored in the corresponding blocks 600.

The above assignment is performed as follows.

Figure 2:
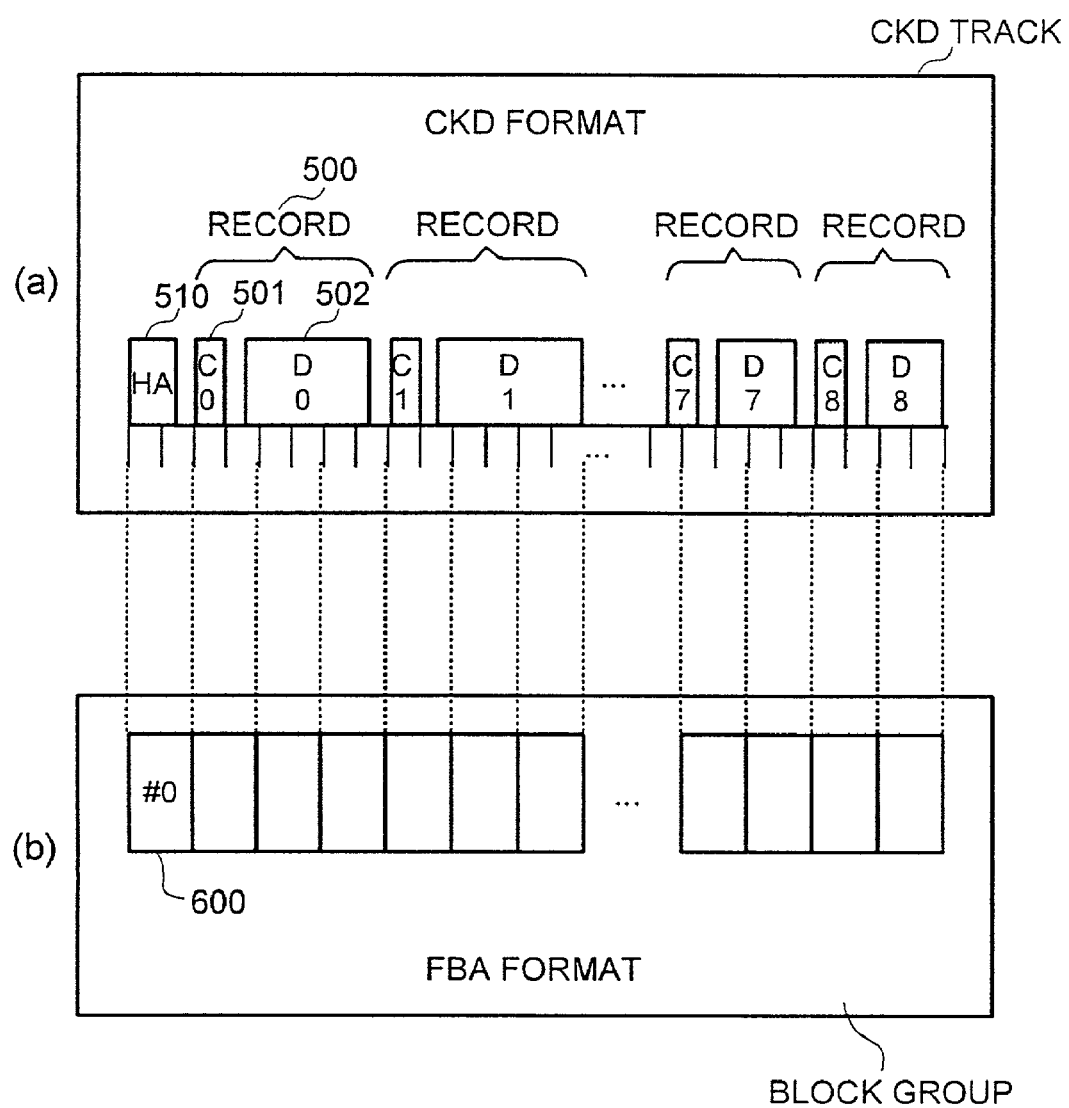
FIGS. 2(a) and 2(b) are diagrams showing a CKD data format used by an embodiment of the present invention.

First, as shown in FIG. 2(*b*), each CKD track is divided into portions the size of the fixed-sized block 600, and the head portion of the first CKD track indicated by both the cylinder number 0 and the head number 0 is assigned to the head block 600 indicated by the number 0. Then, CKD track portions which follow the head portion are assigned to the subsequent blocks 600 until the entire first CKD track is assigned. After that, the head portion of the CKD track indicated by the cylinder number 0 and the head number 1 is assigned to the next subsequent block 600. By repeating the above procedure, the entire portions of each CKD track are assigned to corresponding blocks 600.

In this case, since the length of each CKD track is fixedly decided by the type of logical CKD disk unit employed, the following formulas give the head block number of blocks 600 storing a CKD track and the number of blocks per tack from the address of the CKD track.

number of blocks per CKD track=<CKD track capacity/block capacity>  (Formula 1)

number of head block of CKD track=(cylinder number*number of heads+head number)*number of blocks per CKD track  (Formula 2)

In the above formula 1, <x> denotes a minimum integer equal to or more than x. For example, when the capacity of the block 600 is 2048 bytes and the capacity of a CKD track is 52K bytes and the number of heads is 15, the number of blocks per track is calculated to be <25.39 . . . >, that is, 26. In this case, the number of the head block of the CKD track indicated by the cylinder number 0 and the head number 1 is 26, while the number of the head block of the CKD track indicated by the cylinder number 100 and the head number 5 is 39,130.

A set of blocks 600 to which a CKD track is assigned is hereinafter called a block group.

Next, description will be made of the disk cache area 107, the cache control information 108, and the storage control information 109 implemented in the main storage 103 of the mainframe host 100.

First, the storage control information 109 will be described.

The storage control information 109 holds information indicating the mapping between FBA disk units 150 and logical CKD disk units. Specifically, the storage control information 109 stores information on each logical CKD disk unit, such as the number and the capacity of an FBA disk unit 150 assigned to the logical CKD disk unit, and the type, the track length, the number of cylinders, the number of heads, etc. of the logical CKD disk unit. On the other hand, the number of a logical CKD disk unit assigned to each FBA disk unit 150 is also stored. As for an FBA disk unit 150 to which no logical CKD disk unit has been assigned, the entry field stores information indicating no assignment.

As described above, based on the storage control information 109, the CKD command process 122 emulates a logical CKD disk unit using the FBA disk unit 150.

Next, the disk cache 107 will be described.

The disk cache 107 temporally stores data read from the FBA disk unit 150 as well as data to be written to the FBA disk unit 150.

Figure 4:
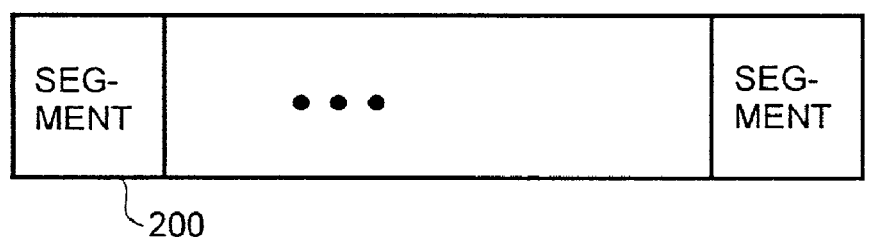
FIG. 4 is a diagram showing a configuration of a disk cache according to the first embodiment of the present invention.

FIG. 4 shows a configuration of the disk cache 107.

According to the example shown in the figure, the disk cache 107 is divided into small fixed-sized portions called segments 200. One segment 200 stores one block group (CKD track).

Finally, the cache control information 108 will be described.

The cache control information 108 is used to control the disk cache 107, and stores control information such as assignment of a segment 200 to each block group.

Figure 5:
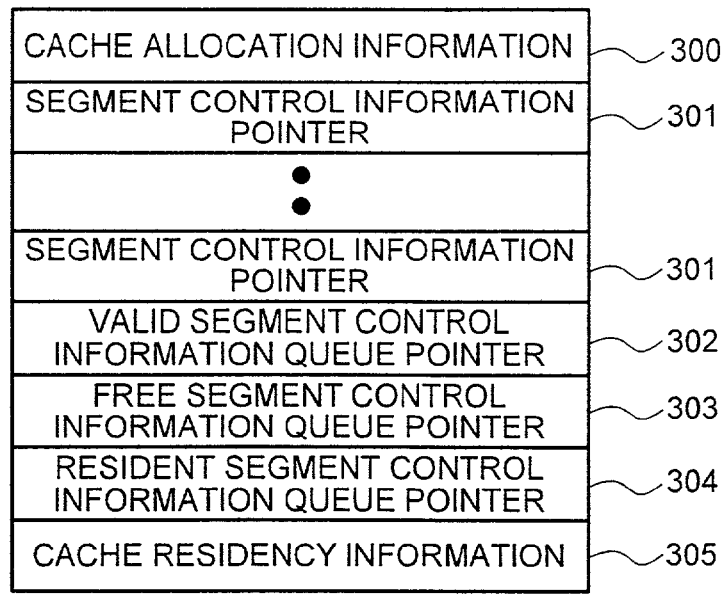
FIG. 5 is a diagram showing a configuration of cache allocation information according to the first embodiment of the present invention.
Figure 6:
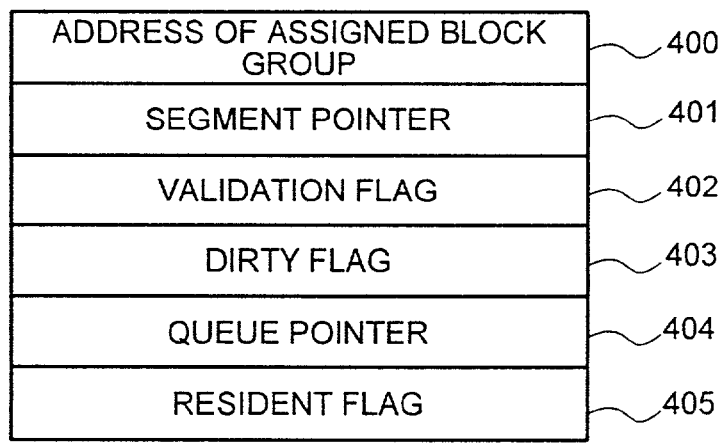
FIG. 6 is a diagram showing a configuration of segment control information according to the first embodiment of the present invention.

FIG. 5 shows cache allocation information 300 included in the cache control information 108, while FIG. 6 shows segment control information 410 also included in the cache control information 108.

In FIG. 5, the cache allocation information 300 is composed of a number of segment control information pointers 301 equal to the total number of block groups, each pointer indicating whether a segment 200 has been assigned to one of the block groups in the FBA disk unit 150. The NULL value is set to a segment control information pointer 301 for a block group to which a segment 200 has not been assigned, while to a segment control information pointer 310 for a block group to which a segment 200 has been assigned, the position of the segment control information 410, described later, corresponding to the segment 200 is set.

A valid segment control information queue pointer 302, a free segment control information queue pointer 303, and a resident segment control information queue pointer 304 are root pointers each pointing to the corresponding queue. The valid segment control information queue is formed by sequentially pointing to each piece of segment control information 410 already assigned to a block group, one piece pointing to the next, using a pointer in the segment control information 410 itself, while the free segment control information queue is formed by sequentially pointing to each piece of segment control information 410 not assigned to a block group, one piece pointing to the next, using a pointer in the segment control information 410 itself. Furthermore, the resident segment control information queue is formed by sequentially pointing to each piece of segment control information 410 already assigned to a block group which is designated as a resident target, one piece pointing to the next, using a pointer in the segment control information 410 itself.

Cache residency information 305 indicates whether each block group is designated as a cache resident. Here, a cache resident means that a block group is stored in the disk cache 107 for a predetermined period of time or a period of time specified by the cache residency information 305. It should be noted that the cache residency information 305 may be a flag employed for each block group, that is, each CKD track, indicating whether the block group should be a cache resident. Alternatively, the cache residency information 305 may indicate the first track address of CKD tracks and the number of the tracks assigned to each range of block groups designated as a cache resident. In this embodiment, the storage control processor 102 sets the cache residency information 305 according to a residency instruction given by an application process running in the CPU 101 using channel commands, etc., or a residency instruction from a service processor. The residency instruction used in this embodiment specifies the range of CKD tracks corresponding to a range of resident-target block groups as a resident range, using the logical CKD disk unit number and the address of the first CKD track and the number of tracks indicating the target range. To reset a resident range, the storage control processor 102 changes the cache residency information 305 also according to a residency instruction given by an application process running in the CPU 101 using channel commands, etc., or a residency instruction from a service processor.

Referring to FIG. 6, the segment control information 410 is provided for each segment 200 in the disk cache 107. An assigned block group 400 in the segment control information 410 stores the CKD disk unit number and the disk address of the CKD track assigned to a block group to which the corresponding segment 200 has been assigned. A segment pointer 401 stores the address of the corresponding segment 200 in the disk cache 107. A validation flag 402 indicates whether data stored in the segment 200 is valid. The validation flag 402 is set ON when a block group read from the FBA disk unit 150 is stored in the segment 200, while it is set OFF when cache allocation to the segment 200 is cancelled. A dirty flag 403 indicates that a change operation (write operation) on a block group stored in the segment 200 is still being performed, or the change is not reflected in the FBA disk unit 150 due to a fault or some other reason. A segment queue pointer 404 is actually composed of a valid segment control information queue pointer, a free segment control information queue pointer, and a resident segment control information queue pointer. They are used to form queues such as the valid segment control information queue and the free segment control information queue as described above, and each point to the position of the next segment control information 410 in the respective queue. A resident flag 405 indicates whether the corresponding segment 200 is set to be resident.

Using the disk cache 107 and the cache control information 108 as described above, the invalidation process 129 monitors each piece of segment control information 410. And when a write operation is performed on the segment 200 corresponding to segment control information 410 designated as a resident target by the resident flag 405, the invalidation process 129 leaves the write data resident in the disk cache 107 without discarding it for a predetermined period of time or a period of time specified by the cache residency information 305 event after the write data was written into a disk unit. When a write operation is performed on the segment 200 corresponding to segment control information 410 not designated as a resident target by the resident flag 405, on the other hand, the invalidation process 129 controls the cache staying time of the write data using a known method such as the LRU method after the write data was written into a disk unit.

Next, description will be made of access operation on the FBA disk unit 150 or a logical CKD disk unit corresponding to the FBA disk unit 150, and the CKD disk unit 151 in a configuration as described above.

Incidentally, in the following descriptions, it is assumed that CCW is used as commands for the access interface of a logical CKD disk emulated by the CKD disk unit 151 or the FBA disk unit 150, while SCSI commands are used as commands for the access interface of the FBA disk unit 150.

Furthermore, in the following descriptions, for clarification, it is assumed that when a host program in the mainframe host 100 accesses a logical CKD disk unit corresponding to the FBA disk unit 150, a CKD track is used as the access data unit, while when the open host 160 accesses the FBA disk unit 150, a block group is used as the access data unit.

When a host program in the mainframe host 100 accesses the CKD disk unit 151, a read request CCW is sent to the CKD disk unit 151 directly from the CPU 101 through the accessing unit for CKD data 105 in order to access CKD format data. On a read access, CKD format data is read from the CKD disk unit 151, and transferred to the originator of the access request, while on a write access, CKD format data received from the originator of the access request is written into the CKD disk unit 151.

When a host program in the mainframe host 100 accesses a logical CKD disk unit emulated by the FBA disk unit 150, the CKD command process 122 in the storage control processor 102 receives a read/write request CCW from the CPU 101. Upon receiving the request, the CKD command process 122 performs the processing shown in FIG. 7.

First, step 801 calculates the address of a block group in the FBA disk unit 150 to which the access target CKD has been assigned, based on the read/write request CCW received from the CPU 101. Specifically, based on a logical CKD disk unit number specified as an access position and the storage control information 109, the position in the FBA disk unit 150 corresponding to the head position of the logical CKD disk unit is calculated. Using this position as a reference, based on a CKD track size and a CKD track number specified as an access position, a block group to which the access-target CKD track has been assigned is obtained by use of the formula (2) described above. A block group to which an access-target CKD track is assigned is hereinafter called an access-target block group.

The access command type is determined at step 802. If it is a read command, the process flow proceeds to step 803, while if it is a write command, the process flow proceeds to step 820.

At step 803, it is determined whether a segment 200 has been assigned to the access-target block group by checking the cache control information 108. If a segment 200 has not been assigned to the access-target block group, the process flow proceeds to step 804 at which a segment 200 is assigned. Assignment of a segment 200 is performed by selecting a piece of segment control information 410 connected to the free segment control information queue, transferring it to the valid segment control information queue, and registering the address of the transferred segment control information 410 in a segment control information pointer 301 in the cache allocation information 300.

At step 805, it is determined whether the access-target block group is in a range designated as a resident target by checking the cache control information 108. If it is in a resident target range, the process flow proceeds to step 806 at which the resident flag 405 of the segment control information 410 assigned to the access-target block group is set ON, and this segment control information 410 is connected to the resident segment control information queue.

Step 807 checks whether the validation flag 402 in the segment control information 410 for the segment 200 assigned to the access-target block group is ON to determine whether the access-target block group is stored in the segment 200. If it is stored in the segment, this state is hereinafter called a cache hit state, while if it is not stored, on the other hand, this is called a cache miss state. In the case of a cache miss state, the process flow proceeds to step 808 at which a read request SCSI command to read the access-target block group is issued to the FBA disk unit 150. With this, the access-target block group is read from the FBA disk unit 150, and stored in the segment 200 assigned to the access-target block group. Then, the validation flag 402 in the segment control information 410 for this segment 200 is set ON.

Step 809 transfers the data stored in the segment 200 to an area in the main storage 103 used by the CPU 101 as its data area.

Step 810 notifies the CPU 101 of the completion of input/output processing requested by the CPU 101. It should be noted that issuance of the notification to the CPU 101 is performed by issuing to the CPU 101 an interruption indicating the completion.

On the other hand, if the access command type is determined to be a write command at step 802, a flow of processes at steps 820 through 824 is performed. Processes at steps 820 through 823 are the same as those at steps 803 through 806 for the read processing.

Step 824 transfers and stores the write data into the segment 200 assigned to the access-target block group, sets ON both the dirty flag 403 and the validation flag 402. Step 825 issues to the FBA disk unit 150 a write request SCSI command to write the write data stored in the segment 200 into the access-target block group. When writing of the write data is completed, the dirty flag 403 in the segment control information 410 is set OFF. Finally, at step 810, the CPU 101 is notified of the completion of input/output processing requested by the CPU 101 itself.

Figure 8:
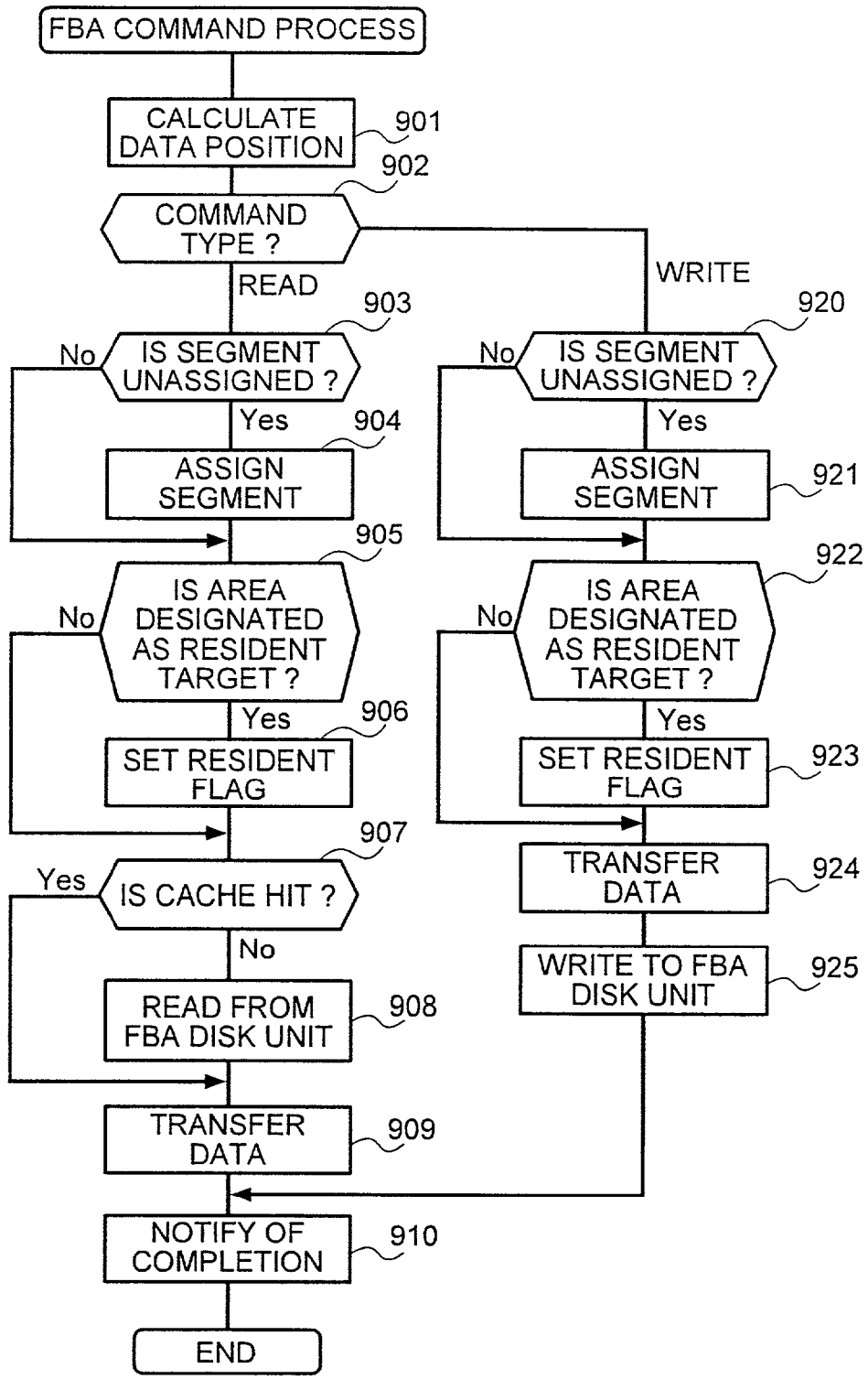
FIG. 8 is a flowchart showing the processing procedure for an FBA command process according to the first embodiment of the present invention.

When the open host 160 accesses a logical FBA disk unit emulated by the FBA disk unit 150, the receiving unit for FBA access 106 receives a read/write access request SCSI command from the open host 160, and delivers it to the FBA command process 123 in the storage control processor 102. Upon receiving this command, the FBA command process 123 performs the processing shown in FIG. 8.

First, step 901 determines the access-target block group in the FBA disk unit 150 based on a block number specified by the SCSI command. In this embodiment, it is assumed that a block in a logical FBA disk unit emulated by the FBA disk unit 150 is mapped to a block of the same block number in the FBA disk unit 150. In this case, the block number specified by the SCSI command directly determines the access-target block group in the FBA disk unit 150. Since processes performed at steps 902 through 908 are the same as those at steps 802 through 808 in FIG. 7, their explanation will be omitted.

Step 909 transfers data of the access-target block group already stored in the segment 200 or newly stored in the segment 200 at step 908 to the open host.

Step 910 notifies the open host of the completion of requested input/output processing. The notification is made through the receiving unit for FBA data access 106.

Figure 7:
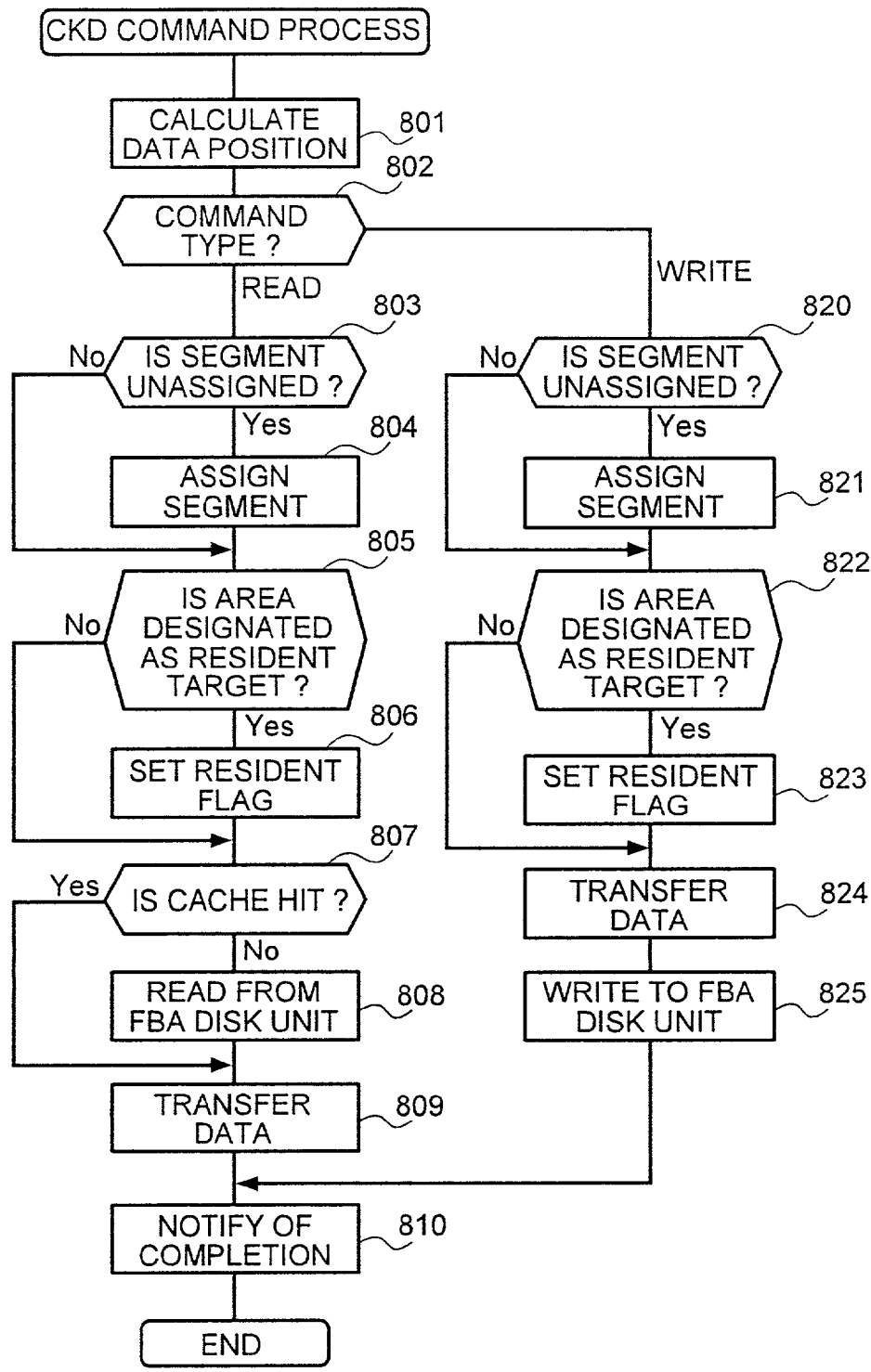
FIG. 7 is a flowchart showing the processing procedure for a CKD command process according to the first embodiment of the present invention.

Since processes performed at steps 920 through 925 are the same as those at steps 820 through 825 in FIG. 7, their explanation will be omitted.

Description will be made below of an operation in which data stored in the CKD disk unit 151 is transferred from the mainframe host 100 to the open host 160 in a computer system as described above.

In this data transfer, the CPU 101 in the mainframe host 100 uses the transfer data generation process 121 to generate transfer data and notify the open host 160 of the results, and, upon receiving the notification, the open host 160 performs data transfer processing.

First, description will be made of processing performed in the transfer data generation process 121.

Incidentally, it is assumed that before any processing is performed in the transfer data generation process 121, based on the residency instruction described above, an entire logical CKD disk unit emulated by the FBA disk unit 150 or a range of CKD tracks used to store intermediate data, described later, is designated as a resident range so as to set the corresponding block groups to be resident.

Figure 9:
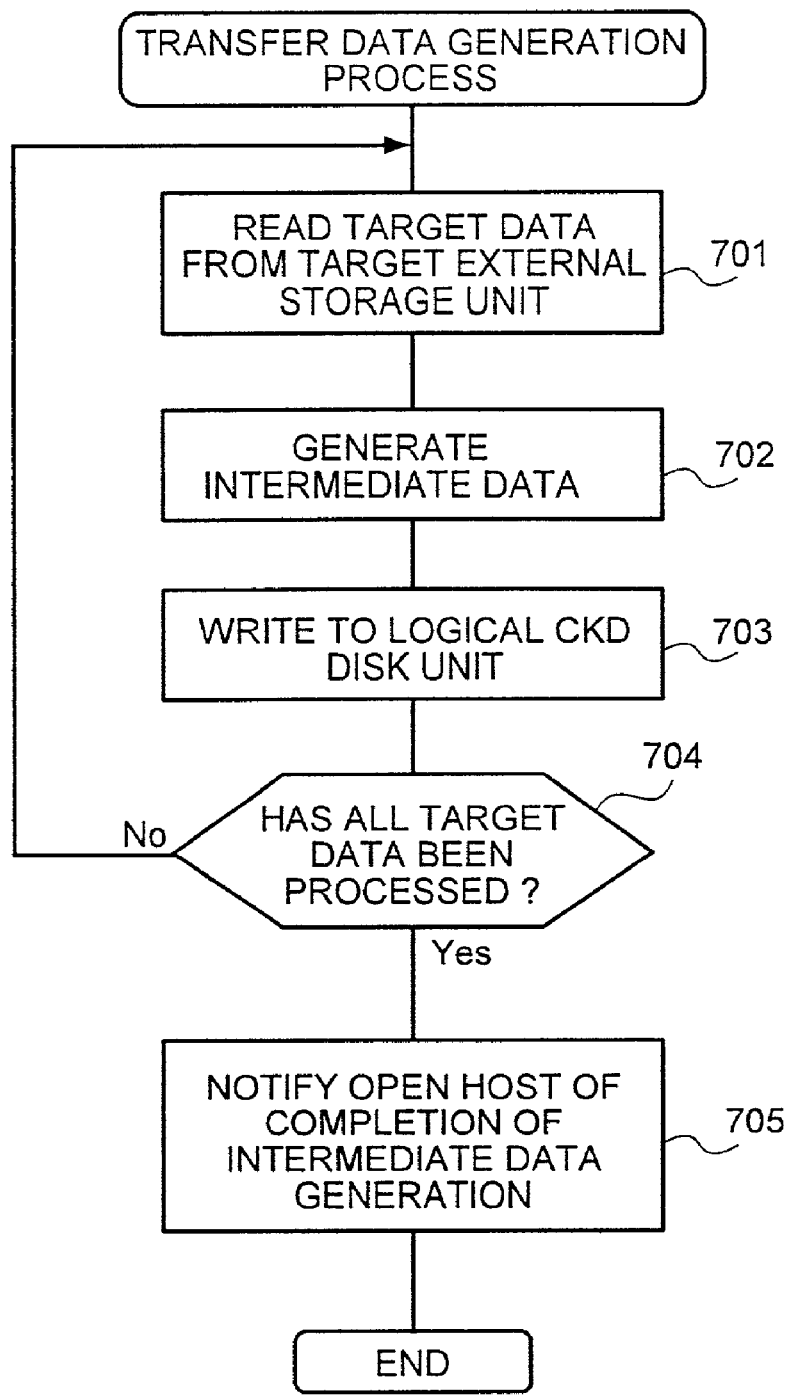
FIG. 9 is a flowchart showing the processing procedure for a transfer data generation process according to the first embodiment of the present invention.

As shown in FIG. 9, the transfer data generation process 121 reads transfer target data from the CKD disk unit 151, and stores it in the main storage 103 at step 701. At that time, the transfer data generation process 121 issues a read request CCW to read the target data of the CKD format from the CKD disk unit 151 through the accessing unit for CKD data 105.

Step 702 generates intermediate data of the CKD format from data 130 of the CKD format read into the main storage 103. The intermediate data is obtained by converting records 500 in the CKD format data 130 into a general-purpose form. When this transformation is not necessary, the read CKD format data 130 may be used as the intermediate data as it is.

Step 703 issues a write request CCW to write the generated intermediate data into CKD tracks in a designated resident-target range in a logical CKD disk unit emulated by the FBA disk unit 150. Upon receiving this CCW, the CKD command process 122 writes the intermediate data of the CKD format into the logical CKD disk unit emulated by the FBA disk unit 150.

Step 704 checks whether the above processing has been completed on all target data, and if not all target data has been processed, the process flow returns to step 701 from which the above processing is repeated. If the above processes at steps 701 through 703 have been completed on all target data, the process flow goes to step 705.

Step 705 notifies the open host 160 of the completion of generation of the transfer data. This notification includes the unit number of the logical CKD disk unit storing the intermediate data and the tack size as well as information used for the open host 160 to determine the address of the intermediate data in the logical CKD disk unit. Here, the first track number and the number of the tracks storing the intermediate data are used as the information to determine the address of the intermediate data in the logical CKD disk unit.

When the open host 160 has received this notification, its data transferring process 124 performs the following processing.

Figure 10:
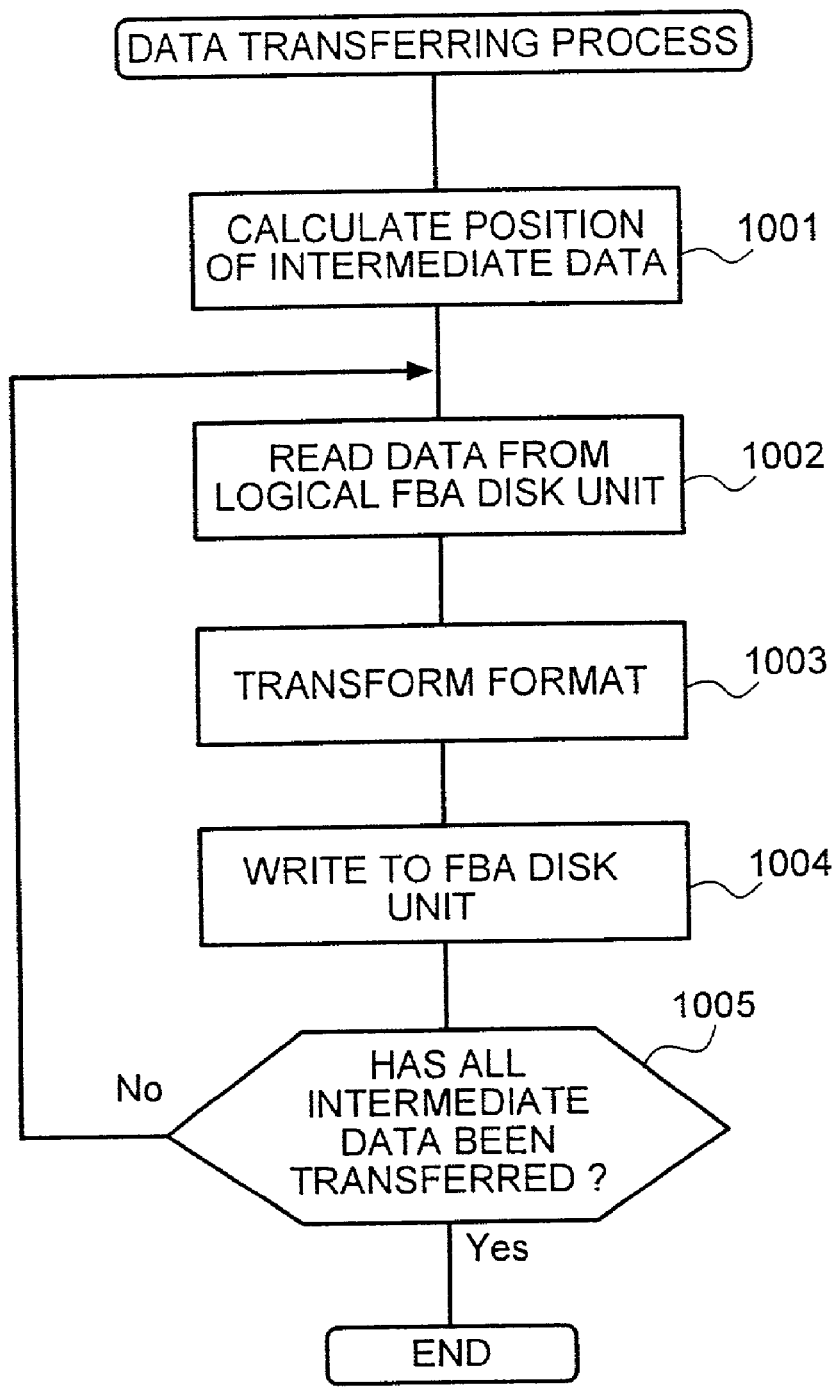
FIG. 10 is a flowchart showing the processing procedure for a data transferring process according to the first embodiment of the present invention.

At step 1001 shown in FIG. 10, the data transferring process 124 calculates the address of the intermediate data in a logical FBA disk unit emulated by the FBA disk unit 150 based on the unit number of the logical CKD disk unit storing the intermediate data, and information indicating the position of the intermediate data in the logical CKD disk unit sent from the mainframe host 100.

Specifically, for example, the position in the FBA disk unit 150 corresponding to the head position of the logical CKD disk unit is obtained. Using this position as a reference, based on the track size and the first track number, the address of the head block in the FBA disk unit 150 storing the intermediate data is calculated by use of the formula (2) described above. In addition, the number of blocks in the FBA disk unit 150 storing the intermediate data is calculated from the number of the tracks by use of the formula (1) described above. In this embodiment, since it is assumed that a block in a logical FBA disk unit emulated by the FBA disk unit 150 is mapped to a block of the same block number in the FBA disk unit 150, an address in the FBA disk unit 150 corresponds to the same address in a logical FBA disk unit emulated by the FBA disk unit 150. Incidentally, other information necessary to calculate the address of the intermediate data in the logical FBA disk unit emulated by the FBA disk unit 150 based on the unit number of the logical CKD disk unit storing the intermediate data and information indicating the position of the intermediate data in the logical CKD disk unit, as described above, is either set in the open host beforehand, or supplied from the mainframe host to the open host together with the logical CKD disk unit number, the track size, and information for specifying other addresses in the logical CKD disk unit.

Step 1002 issues to the mainframe host 100 a read request SCSI command to read at the obtained address in the logical FBA disk unit. This read request is delivered to the storage control processor 102 through the accessing unit for FBA data 106 in the mainframe host 100, and as a result, the intermediate data is transferred from the mainframe host 100 to the data transferring process 124.

Then, at step 1003, the format transformation process 125 searches the transferred intermediate data for the count fields 501 to specify the data fields 502, and extracts only the data fields 502. At that time, the format transformation process 125 may carry out Chinese character code conversion necessary for the open host 160 to use the data fields 502, at the same time. Then, at step 1004, data subjected to extraction and code conversion at step 1003 is written in the FBA disk unit 152.

At step 1005, it is determined whether all intermediate data has been processed. If all the data has been processed, the process flow ends; otherwise, the process flow returns to step 1002.

The above transfer processing is summarized as follows.

The transfer data generation process 121 in the CPU 101 first reads target data from the CKD disk unit 151 and generates intermediate data 131 so that the data will be written in a range set in advance as a resident target in a logical CKD disk unit emulated by the FBA disk unit 150. The CKD command process 122 in the storage control processor 102 actually writes the data in this logical CKD disk unit. At that time, the CKD command process 122 causes the intermediate data to stay resident in the disk cache 107 according to setting given by a residency instruction in advance. After completing generation of the intermediate data, the transfer data generation process 121 notifies the open host 160 of the completion of the generation. When the open host 160 has received the notification from the transfer data generation process 121, its data transferring process 124 is activated. The data transferring process 124 issues to the mainframe host 100 a read request to read the intermediate data from the logical FBA disk unit emulated by the FBA disk unit 150. This read request is received by the receiving unit for FBA data access 106, and transferred to the storage control processor 102. In the storage control processor 102, the FBA command process 123 performs a read operation to read out data resident in the disk cache 107, and transfers the data to the open host 160.

Description will be made of a second embodiment according to the present invention.

This embodiment is different from the first embodiment in that extraction of the data fields 502 from intermediate data and Chinese character code conversion, which are carried out by the open host 160 in the first embodiment, are performed on the mainframe host side 100.

Figure 11:
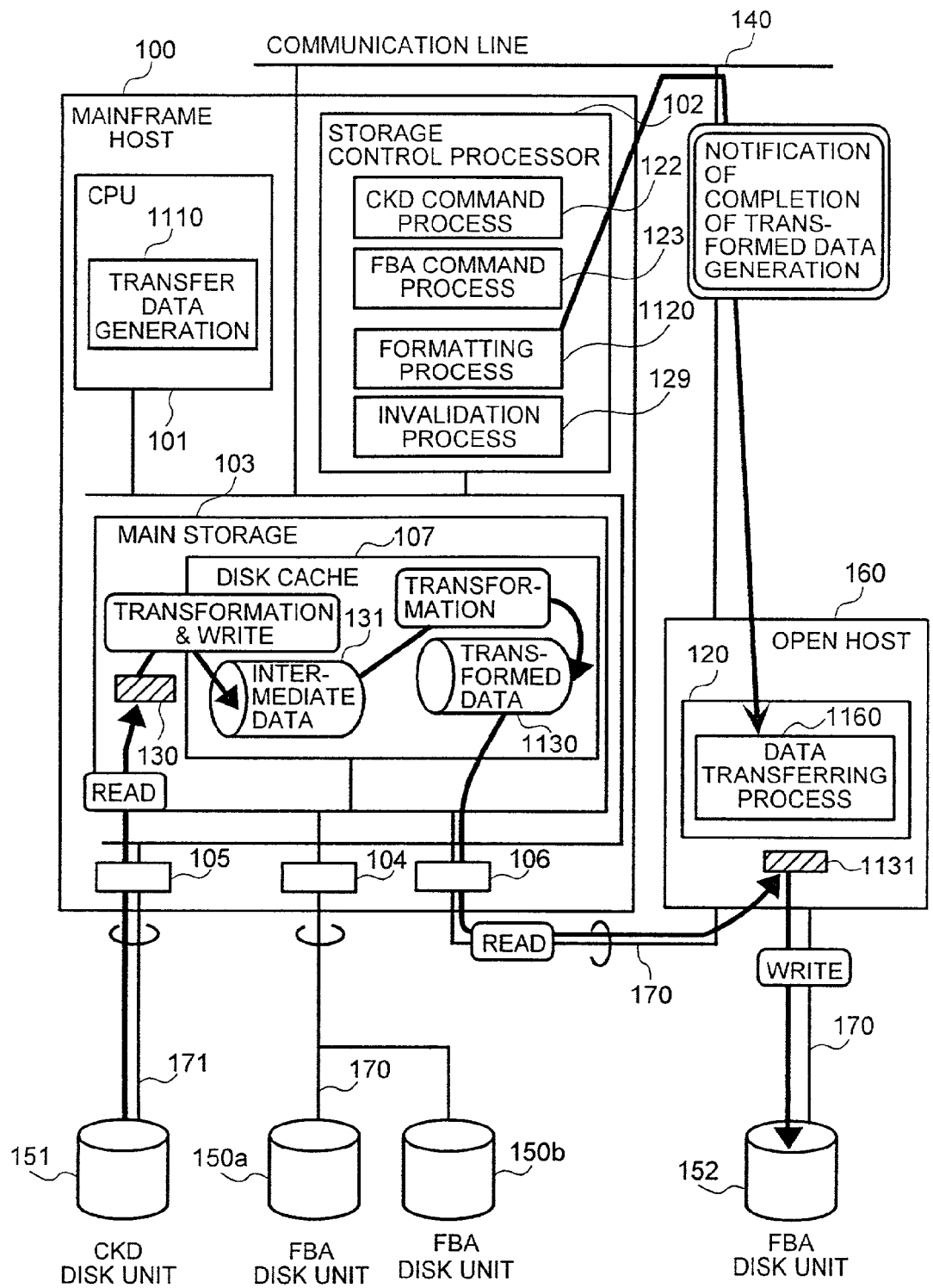
FIG. 11 is a block diagram showing the configuration of a computer system according to the first embodiment of the present invention.

As shown in FIG. 11, in this embodiment, a transfer data generation process 1110 in the CPU 101 generates intermediate data 131, and writes it in a logical CKD disk unit as is the case with the above first embodiment. Then, a CKD command process 122 in a storage control processor 102 causes the intermediate data 131 to stay resident in a disk cache 107. After that, a formatting process 1120 in the storage control processor 102 extracts data fields 502 from the intermediate data 131 stored in the CKD format, carries out Chinese character code conversion, etc. on the data fields 502 to generate converted data 1130. Then, the converted data 1130 is made resident in the disk cache 107, separately. After this process has been completed, the formatting process 1120 supplies the open host 160 with the address of the converted data 1130. In the open host 160, a data transferring process 124 reads the converted data.

Figure 12:
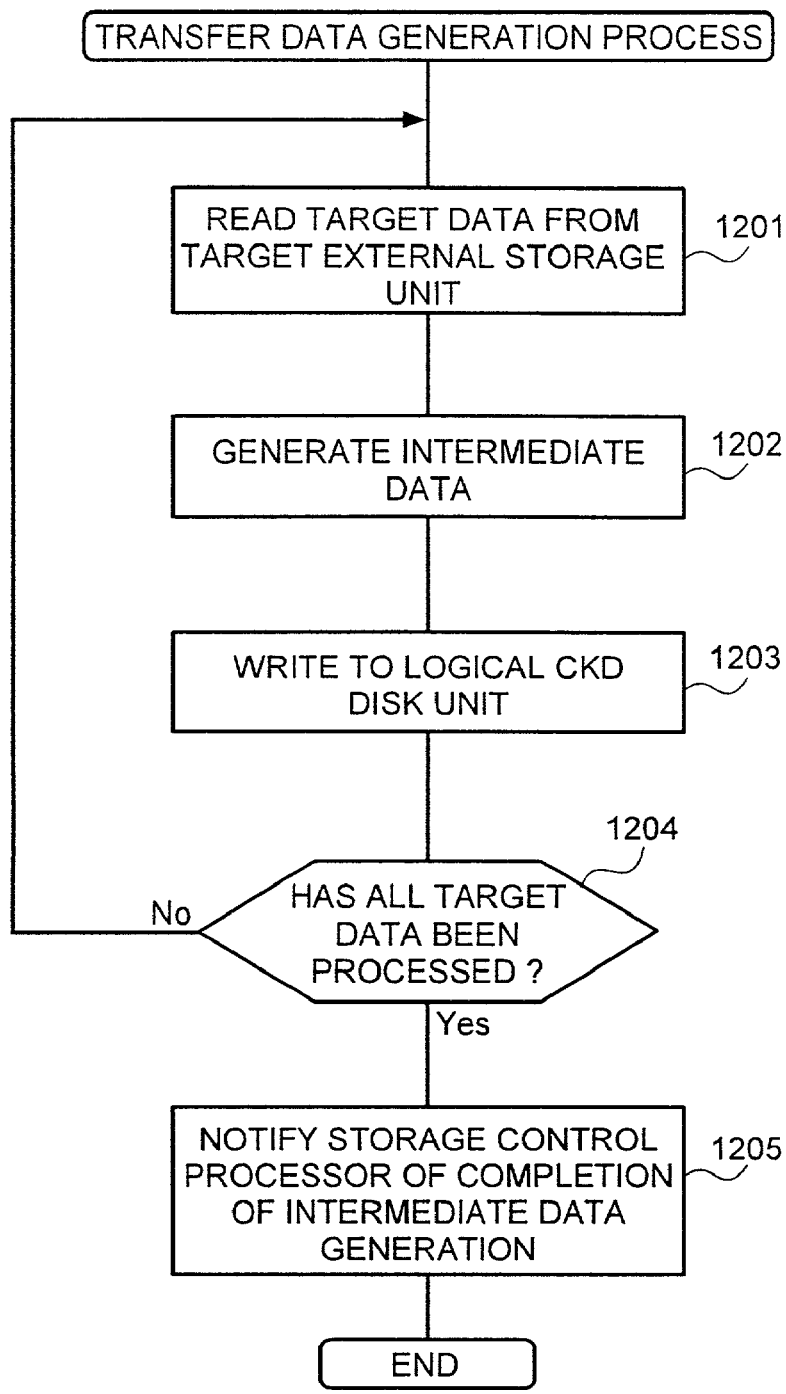
FIG. 12 is a flowchart showing the processing procedure for a transfer data generation process according to a second embodiment of the present invention.

More specifically, in this embodiment, the transfer data generation process 1110 performs the processing shown in FIG. 12.

After processes at steps 1201 through 1204 are performed in the same way as processes at steps 701 through 704 shown in FIG. 9 according to the above first embodiment, step 1205 notifies the storage control processor 102 of completion of generation of the intermediate data, and activates the format transformation process 1120. This completion notification is issued with the number of the logical CKD disk unit storing the intermediate data 131, the track size, and information for specifying the intermediate data attached to it.

Figure 13:
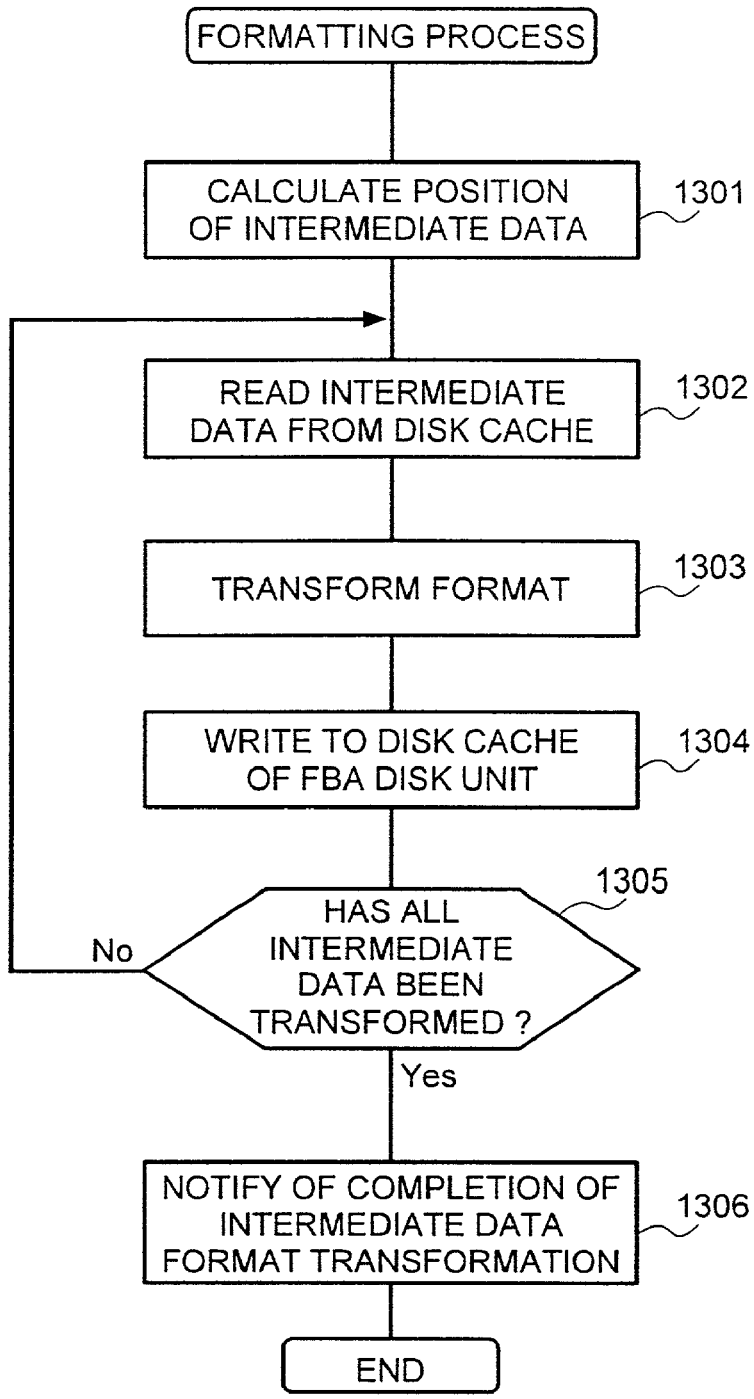
FIG. 13 is a flowchart showing the processing procedure for a formatting process according to the second embodiment of the present invention.

Furthermore, the formatting process 1120 in the storage control processor 102 performs the processing shown in FIG. 13.

First, based on intermediate data position information sent from the transfer data generation process 1110, step 1301 determines a target logical CKD disk unit and the address. At step 1302, when the target intermediate data 131 does not exist in the disk cache 107, the data is read into the disk cache 107.

Then, step 1303 searches the intermediate data 131 in the disk cache 107 for count fields 501 to determine data fields 502, and extracts only the data fields 502. At that time, Chinese character code conversion, etc. may be carried out at the same time. At step 1304, the converted intermediate data 1130 subjected to extraction and code conversion at step 1303 is written into another FBA disk unit 150*b* not assigned to any logical CKD disk unit. At that time, the entire FBA disk unit 150*b* or an area storing the data 1130 is made resident in the disk cache 107. Incidentally, the intermediate data 1130 read from the disk cache 107 may be directly stored in an area in the disk cache 107 assigned to the FBA disk unit 150*b* after the data is subjected to format transformation.

Then, at step 1305, it is determined whether all intermediate data has been processed. If all the data has been processed, the process flow proceeds to step 1306; otherwise, the process flow proceeds to step 1302.

At step 1306, the transfer data generation process 1110 notifies the open host 160 of completion of generation of the converted intermediate data 1130, and activates a data transferring process 1160. This notification is issued with the number of the logical FBA disk unit 150b storing the converted intermediate data 1130, the number of the head block, and the size attached to it.

The data transferring process 1160 in the open host 160 performs the following processing.

Figure 14:
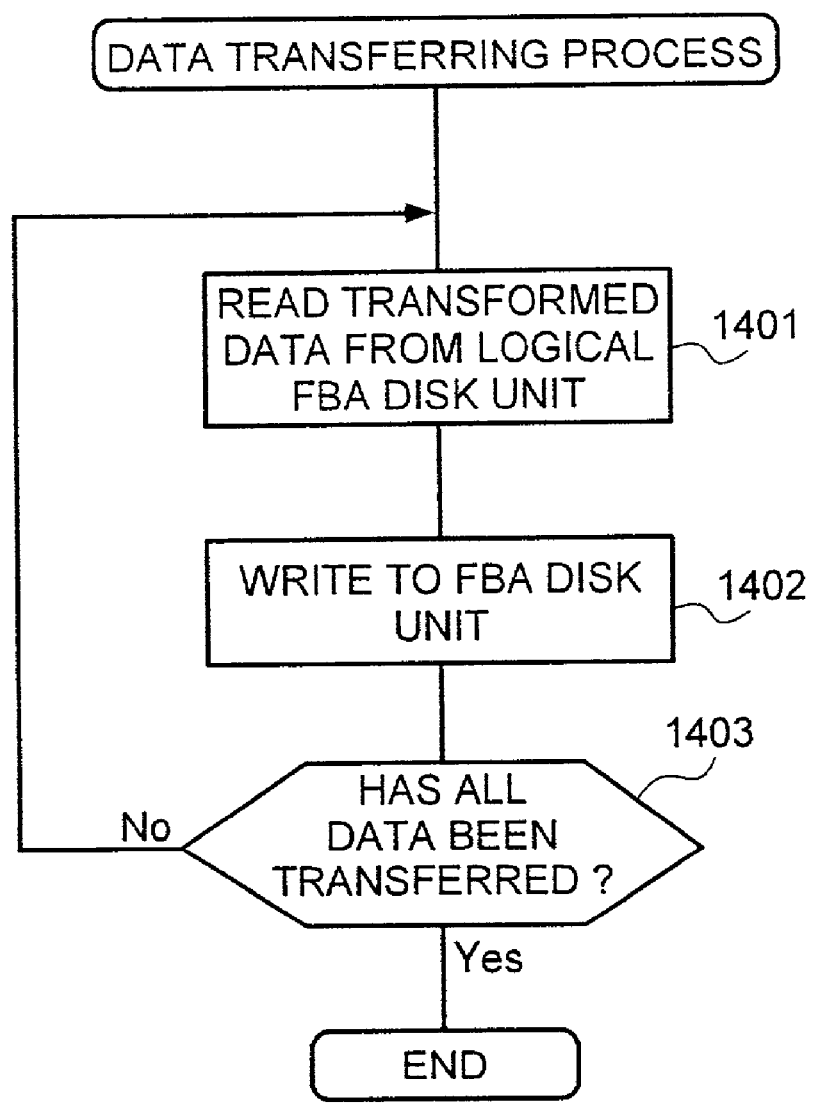
FIG. 14 is a flowchart showing the processing procedure for a data transferring process according to the second embodiment of the present invention.

As shown in FIG. 14, step 1401 issues to the mainframe host 100 a read request to read the converted data 1130 according to the address of the converted data in the FBA disk unit 150b given by the transfer data generation process 1110. With this, the converted data 1130 will be read. This read request is delivered to the storage control processor 102 through an accessing unit for FBA data 106 in the mainframe host 100 and is processed, and as a result, the converted data 1130 is transferred to the open host 160. Step 1402 writes the read-out data into an FBA disk unit 152 connected to the open host 160. Then, at step 1403, it is determined whether all intermediate data has been processed. If all the data has been processed, the process flow ends; otherwise, the process flow returns to step 1401.

According to each embodiment described above, transfer target data stored in the CKD disk unit 151 is made resident in a disk cache by writing the data in a logical CKD disk unit emulated by the FBA disk unit 150. The transfer target data is transferred from the disk cache to the open host 160 when the open host 160 reads the data from a logical FBA disk unit emulated by the FBA disk unit 150.

Therefore, the number of required input/output operations on an actual physical disk unit is only one, that is, reading of data from the CKD disk unit 151. This makes it possible to transfer data at higher speed, compared with the conventional method. At the time of such a data transfer, it is a storage control processor that performs disk cache control including resident control, and receives/analyzes/processes an FBA access request from the FBA data access interface. Therefore, at that time, applications and the OS running in the CPU only write transfer target data in a logical CKD disk unit emulated by the FBA disk unit 150. This means that it is not especially necessary to modify the applications and the OS for the above data transfer.

It should be noted that the present invention is not limited to the above embodiments as various modifications will become possible without departing from the sprit and the scope thereof.

For example, in the above embodiments, data is transferred from the mainframe host 100 to the open host 160. However, by reversing the procedure of this transfer, data may be transferred from the open host 160 to the mainframe host 100 using the disk cache 107 of this embodiment.

For example, the open host 160 writes transfer data in a range designated in advance as a resident target in a logical FBA disk unit emulated by the FBA disk unit 150.

At that time, the FBA command process 123 causes the intermediate data to be resident in the disk cache 107 according to setting given by a residency instruction issued in advance. Then, the transfer data generation process 121 in the mainframe host 100 issues a read request to read the transfer data from a logical CKD disk unit emulated by the FBA disk unit 150. The CKD command process 122 reads out the transfer data resident in the disk cache, transforms it into the CKD format, and writes the converted data in the CKD disk unit 151. Here, information necessary to recognize the positions of the resident area and the transfer data storage area in a logical FBA disk unit and a logical CKD disk unit is suitably exchanged between, for example, the open host 160 and the mainframe host 100 so that both can obtain the necessary information.

Furthermore, in the above embodiments, although a track is used as the access data unit when accessing intermediate data, a record may be used as the access data unit instead. In this case, however, the CKD command process 122, the FBA command process 123, etc. must calculate the position of a target record, and perform a write/read operation on each individual record. Furthermore, when variable-sized records are used, it is necessary to calculate the position of a target record based on its count field. In this case, before writing a record, it is necessary to read a block group including the record into a disk cache.

In the above embodiments, transfer target data is stored in the CKD disk unit 151. However, the target data may be in a logical CKD disk unit emulated by the FBA disk unit 150. In this case, the transfer data generation process 121 reads the target data from the logical CKD disk unit emulated by the FBA disk unit 150 instead of the CKD disk unit 151. Furthermore, the FBA disk unit 150 may be a logical FBA disk unit emulated by a RAID. In this case, the storage control processor may perform the emulation of the logical FBA disk unit using the RAID, that is, perform such controls as mapping control between the logical FBA disk unit and physical FBA disk units constituting the RAID, and access control to each physical FBA disk unit, as the storage control information 107, or alternatively a control processor employed in the RAID may perform the above controls.

In the above embodiments, a data set name as described in Japanese Laid-Open Patent Publication No. 9-258908 (1997) may be used as information which specifies the address of intermediate data in a logical CKD disk unit and which is supplied from the mainframe host 100 to the open host 160. In this case, the open host 160 refers to data set control information for the logical CKD disk unit, as employed by the invention described in the above patent publication, to obtain the address and the size of the data set in the logical CKD disk unit, and converts this address to an address for FBA access.

Furthermore, the above embodiments employ the so-called store through system in which writing into the disk cache 107 is synchronized with writing into the FBA disk unit 150. However, embodiments of the present invention can be applied to the so-called store back system in which writing into the disk cache 107 and writing into the FBA disk unit 150 are performed asynchronously. In this case, when a write operation is to be performed on a range designated as a resident target in a logical CKD disk unit or a logical FBA disk unit, even after occurrence of a predetermined event causes the write data to be written into the FBA disk unit emulating these disk units as in the case of a known store back system, the data may be left resident in the disk cache 107 for a predetermined period of time or a period of time specified by the cache residency information 305 without discarding the data. It should be noted that in the case of a store back system, to prevent loss of unreflected data, it is desirable to duplex the disk cache 107 or adopt a non-volatile system by use of batteries so as to enhance availability, or to add check codes, etc. so as to detect loss of unreflected data.

Even though the above embodiments actually employ the FBA disk unit 150, when a logical CKD disk unit emulated by the FBA disk unit 150 is used only for data transfer to the open host 160, the FBA disk unit 150 may not be used. Instead of using the FBA disk unit, areas in the main storage or areas in a memory separately provided may be used to emulate a logical variable-sized record storage unit or a logical fixed-sized block storage unit, which are emulated by the FBA disk unit 150 in the above embodiments.

Although the above functionality has generally been described in terms of specific hardware and software, it would be recognized that the invention has a much broader range of applicability. For example, the software functionality can be further combined or even separated. Similarly, the hardware functionality can be further combined, or even separated. The software functionality can be implemented in terms of hardware or a combination of hardware and software. Similarly, the hardware functionality can be implemented in software or a combination of hardware and software. Any number of different combinations can occur depending upon the application.

Many modifications and variations of the present invention are possible in light of the above teachings. Therefore, it is to be understood that within the scope of the appended claims, the invention may be practiced otherwise than as specifically described.

What is claimed is:

1. A first computer system comprising:
   a first accessing unit coupled to a first disk unit storing data in a first format;
   a second accessing unit coupled to a second disk unit storing data in a second format, wherein the second format is different from the first format;
   a CPU for issuing a first type access request according to the first format;
   an interface configured to receive a second type access request according to the second format from a second computer system;
   a processor configured to receive the first type access request from said CPU and the second type access request from said second computer system via said interface;
   a disk cache configured to store data accessed from one of said CPU or said second computer system previously;
   first information on data locations in said second disk unit, wherein said first information includes location information of data stored in said second disk unit according to the second format and corresponding location information according to the first format; and
   second information indicating whether data stored in said second disk unit is stored in said disk cache or not, wherein said second information includes data location information of data stored in said second disk unit according to the second format and an information indicating whether data stored in the corresponding location in said second disk unit is stored in said disk cache or not;
   wherein said processor is configured to receive the first type access request from said CPU, control said second accessing unit to write the target data of said first type access request to said second disk unit by referring to said first information, store said target data in said disk cache, and update said second information;
   wherein when said processor receives the second type access request to read said target data from said second computer system via said interface, said processor judges whether said target data is stored in said disk cache based on said second information; and
   wherein if said target data is stored in said disk cache, said processor transmits said target data stored in said disk cache to said second computer system via said interface.

2. The first computer system of claim 1, wherein
   when said processor receives the first type access request to read said target data from said CPU, said processor determines a location of said target data in said second disk unit according to the first type access request based on said first information and judges whether said target data is stored in said disk cache based on said second information; and
   if said target data is stored in said disk cache, said processor transmits said target data based on said disk cache to said CPU.

3. The first computer system of claim 1, wherein said second format is a Fixed Block Architecture (FBA) format.

4. The first computer system of claim 1, wherein said first format is a Count Key Data (CKD) format.

5. The first computer system of claim 1, wherein said first computer system is a mainframe computer.

6. The first computer system of claim 1, wherein said second computer system is a PC or a workstation computer.

7. The first computer system of claim 1, wherein
   said CPU reads target data which is to be transmitted to said second computer system from said first disk unit and issues a first type access request to write said target data to said second disk unit;
   said processor receives said first type access request from said CPU, stores the target data to said disk cache and updates said second information, by referring to said first information; and
   after storing said target data in said disk cache, said processor transmits said target data stored in said disk cache to said second computer system.

8. A method of transferring information between a first computer system and a second computer system, the first computer system including a first accessing unit coupled to a first disk unit storing data in a first format; a second accessing unit coupled to a second disk unit storing data in a second format, wherein the second format is different from the first format; a CPU for issuing a first type access request according to the first format; a disk cache configured to store data accessed from one of said CPU or said second computer system previously; first information on data locations in said second disk unit, wherein said first information includes location information of data stored in said second disk unit according to the second format and corresponding location information according to the first format; and second information indicating whether data stored in said second disk unit is stored in said disk cache or not, wherein said second information includes data location information of data stored in said second disk unit according to the second format and an information indicating whether data stored in the corresponding location in said second disk unit is stored in said disk cache or not; the method comprising:
   receiving the first type access request from said CPU;
   controlling said second accessing unit to write the target data of said first type access request to said second disk unit by referring to said first information;
   storing said target data in said disk cache;
   updating said second information;
   when receiving the second type access request to read said target data from said second computer system via an interface, judging whether said target data is stored in said disk cache based on said second information; and if said target data is stored in said disk cache, transmitting said target data stored in said disk cache to said second computer system via said interface.

9. The method of claim 8, further comprising when receiving the first type access request to read said target data from said CPU, determining a location of said target data in said second disk unit according to the first type access request based on said first information and judging whether said target data is stored in said disk cache based on said second information; and if said target data is stored in said disk cache, transmitting said target data based on said disk cache to said CPU.

10. The method of claim 8, wherein said second format is a Fixed Block Architecture (FBA) format.

11. The method of claim 8, wherein said first format is a Count Key Data (CKD) format.

12. The method of claim 8, wherein said first computer system is a mainframe computer.

13. The method of claim 8, wherein said second computer system is a PC or a workstation computer.

14. The method of claim 8, wherein said CPU reads target data which is to be transmitted to said second computer system from said first disk unit and issues a first type access request to write said target data to said second disk unit; the method further comprising:

receiving said first type access request from said CPU;

storing the target data to said disk cache and updates said second information, by referring to said first information; and after storing said target data in said disk cache, transmitting said target data stored in said disk cache to said second computer system.

15. A computer readable medium storing a computer program for transferring data between a first computer system and a second computer system, the first computer system including a first accessing unit coupled to a first disk unit storing data in a first format; a second accessing unit coupled to a second disk unit storing data in a second format, wherein the second format is different from the first format; a CPU for issuing a first type access request according to the first format; a disk cache configured to store data accessed from one of said CPU or said second computer system previously; first information on data locations in said second disk unit, wherein said first information includes location information of data stored in said second disk unit according to the second format and corresponding location information according to the first format; and second information indicating whether data stored in said second disk unit is stored in said disk cache or not, wherein said second information includes data location information of data stored in said second disk unit according to the second format and an information indicating whether data stored in the corresponding location in said second disk unit is stored in said disk cache or not; said computer program comprising:

code for receiving the first type access request from said CPU;

code for controlling said second accessing unit to write the target data of said first type access request to said second disk unit by referring to said first information;

code for storing said target data in said disk cache;

code for updating said second information;

code for, when receiving the second type access request to read said target data from said second computer system via an interface, judging whether said target data is stored in said disk cache based on said second information; and code for, if said target data is stored in said disk cache, transmitting said target data stored in said disk cache to said second computer system via said interface.

16. The computer readable medium of claim 15, wherein the computer program further comprises:

code for, when receiving the first type access request to read said target data from said CPU, determining a location of said target data in said second disk unit according to the first type access request based on said first information and judging whether said target data is stored in said disk cache based on said second information; and code for, if said target data is stored in said disk cache, transmitting said target data based on said disk cache to said CPU.

17. The computer readable medium of claim 15, wherein said second format is a Fixed Block Architecture (FBA) format.

18. The computer readable medium of claim 15, wherein said first format is a Count Key Data (CKD) format.

19. The computer readable medium of claim 15, wherein said CPU reads target data which is to be transmitted to said second computer system from said first disk unit and issues a first type access request to write said target data to said second disk unit; wherein the computer program further comprises:

code for receiving said first type access request from said CPU;

code for storing the target data to said disk cache and updates said second information, by referring to said first information; and code for, after storing said target data in said disk cache, transmitting said target data stored in said disk cache to said second computer system.

* * * * *